April 4, 1961 K. SECUNDA 2,978,101
HARDNESS TESTING DEVICE
Filed Dec. 1, 1958 2 Sheets-Sheet 2

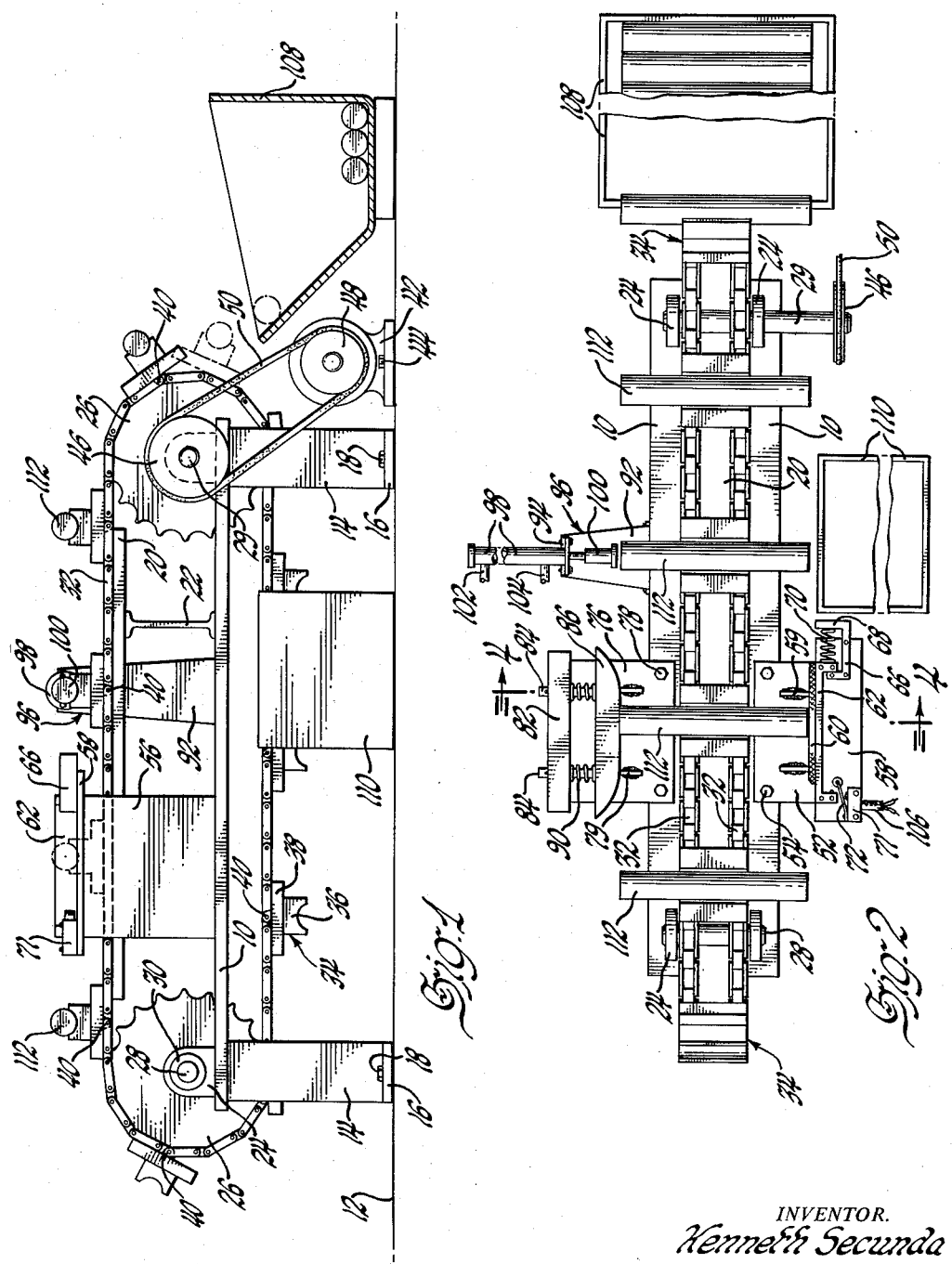

INVENTOR.
Kenneth Secunda
BY
*L.D. Burch*
ATTORNEY

United States Patent Office 2,978,101
Patented Apr. 4, 1961

2,978,101

HARDNESS TESTING DEVICE

Kenneth Secunda, Detroit, Mich., assignor to General Motors Corporation, Detroit, Mich., a corporation of Delaware Filed Dec. 1, 1958, Ser. No. 777,346

3 Claims. (Cl. 209—73)

This invention relates to a hardness testing device and more particularly to an apparatus for determining the relative hardness of workpieces on a production line basis.

In many production line installations, it is necessary to determine the relative hardness of workpieces moving along an assembly line with respect to some known hardness. In the past, it has been necessary to make such a determination through the use of standard hardness testing instruments, such as Rockwell or Brinnell testing machines, requiring the placing of each individual workpiece on the tester by the operator. This obviously slows down the production line operations and increases the cost of produced items, due to the time spent in determining the hardness of the individual workpiece and the necessity of highly skilled operators to operate the testing machines.

The device in which this invention is embodied eliminates most of the difficulties attendant in this type of operation. It has been found that an object having a useful hardness, such as a file, may be used as the basis for determining the relative hardness of the workpieces. If a file is slidably mounted adjacent a workpiece, and a workpiece is of a hardness equal to or greater than the hardness of the file, the piece may be rubbed against the file and will slide smoothly past the file without moving the file. If the piece is of hardness less than the hardness of the file and is rubbed against the file, the teeth of the file will bite into the workpiece and movement of the piece will cause movement of the file therewith.

It is here proposed to provide a device adaptable to a production line installation, and one that carries out the hardness checking operation automatically. The device comprises, generally, a frame with conveyor means mounted thereon and a bracket mounted on the frame on which a file is slidably secured. A workpiece is carried past the file by the conveyor and a shoe, on the opposite side of the conveyor, forces the workpiece into engagement with the file. If the piece is sufficiently hard it will slide smoothly past the file and be acceptable. Insufficient hardness will cause the file to move, actuating a reject mechanism to eject the piece from the conveyor.

The device eliminates the costly individual hardness testing operation using standard machines, and is adaptable to modern assembly line production techniques. The operation is automatic and relatively simple, allowing the use of unskilled labor, or can be easily adapted to automation to eliminate an operator altogether. A great saving in cost and labor is thus realized by the producer, the cost saving being one that may be passed on to the consumer.

These and other advantages of the device will become more apparent from the following description and drawings in which:

Figure 1 is an elevational view of the device showing the relative location of the various parts.

Figure 2 is a plan view of the device shown in Figure 1 illustrating the use of the conveyor and shoe to bias the workpiece into engagement with the file.

Figure 3:
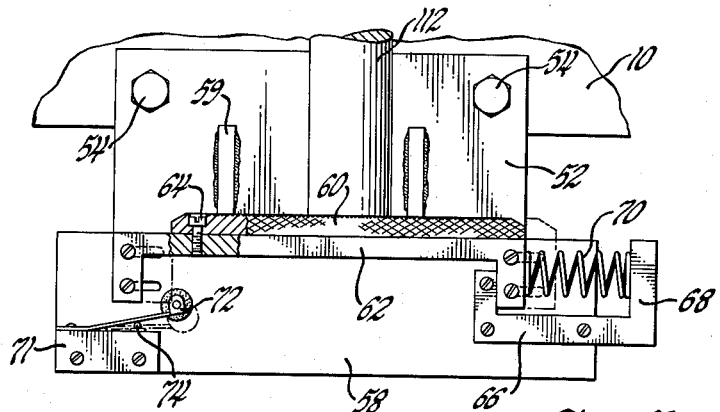
Figure 3 is an enlarged view of a portion of Figure 1 showing the file mounted on the file bracket and the workpiece in engagement therewith.
Figure 4:
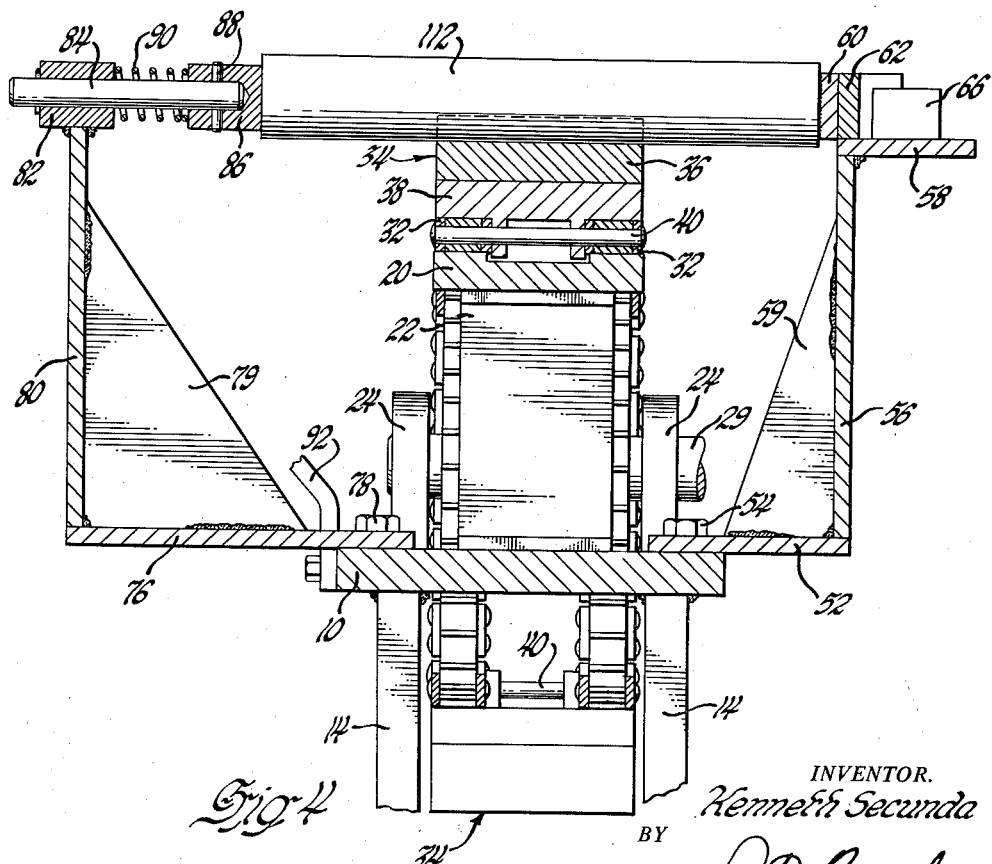
Figure 4 is a cross sectional view of the device shown in Figure 1 taken substantially along the line 4—4 of Figure 2 and looking in the direction of the arrows.

Referring more particularly to the drawings, Figures 1 and 2 best illustrate the over-all machine. A main frame member 10 is suitably mounted above the plant floor 12 by a plurality of legs or supports 14. The legs have outwardly directed flanges 16 at the bottom thereof which may be bolted directly to the floor 12, as by the bolts 18, for better stability of the machine. An upper frame member 20 is spaced from the lower member 12 by a plurality of I-beam sections 22. The upper frame member 20 serves as a guide for the conveyor chain which will be later described.

Secured to the lower frame member in any suitable manner, as by welding or bolts, are a plurality of axle supports 24. Mounted between the supports 24 and the legs 14 are the sprocket members 26, carried on the axles 28 and 29 which in turn are carried by the axle supports 24. Suitable bushings 30 in the axle supports provide the necessary bearing surfaces for the axles 28 and 29. The sprocket members 26 may be of any suitable type or number, depending on the type of conveyor chain 32 which is used with the device. The apparatus illustrated employs a double link type conveyor chain and four sprocket members 26 to suitably move the chain sections.

A plurality of workpiece receiving members, illustrated generally by the numeral 34, are secured to the conveyor chain. Each member comprises a block 36 secured to a plate 38, the plate in turn being secured between the conveyor chains 32 by a pin 40. Thus, the workpiece receiving members 34 are carried by the conveyor chain and around the sprocket members 26.

The conveyor system may be driven in any suitable manner, one form of drive being illustrated in Figure 1 as an electric motor 42 mounted on the plant floor 12, as by bolts 44, and driving a pulley 46 secured to the axle 29. The pulley 48, on the electric motor 42, and a belt or chain 50 rotate the sprocket members through the axle 29 to drive the chains 32.

A bracket 52 is secured to the lower frame member 10, as by bolts 54, and has a portion 56 extending upwardly to support a plate member 58. Triangular members 59 rigidly support the upstanding portion 56. A file 60 is secured to the block 62, as by bolts 64, the block 62 being slidably mounted on the plate 58. A second block 66 is rigidly secured to the plate 58 and has an arm 68 extending inwardly to serve as a support for the spring 70. The spring acts between the arm 68 and the block 62, on which is secured the file 60, to bias the file toward the left as viewed in Figure 3.

A limit switch 71 is secured to the plate 58 and has an actuating arm 72 extending toward the block 62. The actuating arm 72 closes the contact 74 to actuate the switch when the block 62 and file 60 are moved to the right as viewed in Figure 3. The purpose of the limit switch 71 will be later described.

Opposite the conveyor chains 32 from the file bracket 52 is the shoe bracket 76, secured to the lower frame member 10, by bolts 78. The shoe bracket 76 has a portion 80 extending upwardly to a point adjacent the level of the workpiece traveling along the conveyer system. Triangular members 79 support the upstanding portion 80. A block member 82 is secured, as by welding, to the upstanding portion 80 and has a pair of rods 84 extending therethrough. The shoe 86 is secured on the ends of the rods 84, as by pins 88, and a pair of springs 90 act between the block 82 and the shoe 86 to bias the shoe toward the conveyor chains 32. The operation and purpose of the shoe assembly will be later described.

Adjacent the shoe bracket 76 is a third bracket 92, secured to the frame member 10 in any suitable manner, as by welding or bolts. The bracket has an upstanding portion 94 to which is secured the reject assembly, illustrated generally by the numeral 96. The assembly consists of a cylinder 98 having a piston 100 therein, the piston extending toward the conveyor chains 32 and at the level of the workpiece passing therealong. The piston may be actuated by air pressure, the cylinder having inlet and outlet conduits 102 and 104 suitably connected to a conventional air switch which is in turn actuated by the limit switch 71 through a suitable electric conduit 106. The piston member 100 may be of the well known double action type, that is air entering the cylinder 98 through the conduit 102 will move the piston outwardly in the cylinder, exhausting air through the conduit 104, and air entering the cylinder 98 through the conduit 104 will return the piston 100 exhausting the cylinder through the conduit 102.

Adjacent the end of the device is a bin 108 for collecting the acceptable workpieces after they have passed the rejection assembly 94. A second bin 110 located adjacent the reject station collects the rejected workpieces.

The operation of the device is as follows: The conveyor chain is driven through the electric motor 42 and the belt or chain 50, and a workpiece 112 is placed on the workpiece receiving block 34 as the block approaches the upper reach of the conveyor chain. The workpiece and block ride along the upper frame member 20, and are passed between the file 60 and the shoe 86, the shoe biases the workpiece, through the springs 90, into rubbing engagement with the file 60. If the workpiece is of a hardness equal to or greater than the file 60, it will slide smoothly past the file without moving the file on the plate 58 against the pressure of the spring 70. The workpiece then passes along the conveyor chain and is dropped into the acceptable bin 108 as it passes around the sprockets 26.

If the workpiece is of hardness less than the hardness of the file, as it passes between the shoe 86 and the file 60 the teeth of the file will bite into the workpiece 112 and the movement of the workpiece by the conveyor will cause the file to move to the right, as viewed in the drawings, the block 62 engaging the contact arm 72 to close the contact 74 of the limit switch 71. The air switch is then operated to actuate the reject device, air entering the conduit 102 in the cylinder 92 to drive the piston 100 outwardly and the workpiece 112 off the block 34 and into the bin 110.

It may thus be seen that a relatively simple hardness testing device is provided which is simply operated and easily adaptable to a great number of workpieces and methods of operation. The conveyor means may be driven in any suitable manner and the method of placing the workpiece on the conveyor means and removing them from the conveyor means may be adapted to automated assembly line procedures.

The claims:

1. A device for determining the hardness of a workpiece comprising a frame, movable conveyor means secured to said frame and having a plurality of workpiece receiving blocks mounted thereon, a first bracket mounted on said frame and extending adjacent the path of said blocks, a plate secured to said bracket and having a file slidably mounted thereon, a second bracket mounted on the opposite side of said frame from said first bracket and having a resiliently biased shoe mounted thereon, spring means on said plate and biasing said file in a direction opposite to the direction of movement of said conveyor, reject means mounted on said frame and spaced from said file in the direction of movement of said conveyor and operably connected to said file to reject a workpiece of insufficient hardness from said blocks, each of said blocks carrying a workpiece between said shoe and said file, the workpiece sliding along said file if of a hardness greater than said file and the workpiece moving said file if of less hardness than said file, movement of said file being sufficient to actuate said reject means to remove the workpiece from said block and said conveyor means.

2. A device for determining the hardness of a workpiece comprising a frame, movable conveyor means mounted on said frame and having a plurality of workpiece receiving blocks carried therewith, a first bracket mounted on said frame and extending adjacent the path of said blocks and the workpieces carried thereby, a file slidable on said bracket and having a face engageable with an end of a workpiece as the workpiece is carried past said file by said block and said conveyor means, a limit switch secured to said first bracket and actuated by said file when said file slides on said first bracket, a second bracket secured to said frame and spaced from said first bracket, a resiliently biased shoe mounted on said second bracket to engage the other end of said workpiece and force said workpiece into engagement with the file as the workpiece is carried by said block and said conveyor means between the shoe and said file, spring means secured to said first bracket and engaging said file and biasing said file in a direction opposite to the direction of movement of said conveyor means, and reject means spaced from said file in the direction of movement of said conveyor means and secured to said frame and operable by said limit switch to move the workpiece off said block and said conveyor means when the workpiece causes said file to slide on said first bracket and actuate said limit switch, said file sliding on said first bracket only when said workpiece is of a hardness less than the hardness of said file.

3. A device for determining the relative hardness of a workpiece comprising a frame, movable conveyor means secured to said frame, a plurality of blocks secured to said conveyor and movable therewith, each of said blocks adapted to receive a workpiece and carry said workpiece with said conveyor, a file secured to said frame and slidable therealong in the direction of movement of said conveyor and having a face thereof engageable with one surface of the workpieces carried therepast by said blocks, first spring means secured to said frame and operable to force the workpieces carried by said blocks into engagement with said file, second spring means on said frame and biasing said file in a direction opposite to the direction of movement of said conveyor, and reject means secured to said frame and spaced from said file in the direction of movement of said conveyor, said reject means being actuatable by said file to eject a workpiece from said blocks and said conveyor if the workpiece is of less hardness than said file and slides said file on said frame, said file remaining stationary and said reject means inoperable when the workpiece is of a hardness greater than said file and passes said file without sliding said file on said frame.

References Cited in the file of this patent

UNITED STATES PATENTS

| 907,999   | Herbert et al. | Dec. 29, 1908 |
|-----------|----------------|---------------|
| 1,136,051 | Ryon           | Apr. 20, 1915 |
| 1,254,690 | Hazard         | Jan. 29, 1918 |
| 2,866,548 | Simpson et al. | Dec. 30, 1958 |